US011625656B2

(12) United States Patent
Gutsol et al.

(10) Patent No.: US 11,625,656 B2
(45) Date of Patent: Apr. 11, 2023

(54) ON-DISPATCH IDENTIFICATION AND ASSIGNMENT OF UNRESOLVED TASKS

(71) Applicant: MOTOROLA SOLUTIONS, INC., Chicago, IL (US)

(72) Inventors: Tanya Gutsol, Chicago, IL (US); Brian J. Frommelt, Deer Park, IL (US); Eric Johnson, Chicago, IL (US); David Kaleko, Oak Park, IL (US); Raguraman Kumaresan, Evanston, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 178 days.

(21) Appl. No.: 16/725,188

(22) Filed: Dec. 23, 2019

(65) Prior Publication Data
US 2021/0192422 A1 Jun. 24, 2021

(51) Int. Cl.
*G06Q 30/00* (2012.01)
*G06Q 10/0631* (2023.01)
(Continued)

(52) U.S. Cl.
CPC ........... *G06Q 10/063112* (2013.01); *G06Q 10/063114* (2013.01); *G06Q 50/26* (2013.01); *H04W 4/023* (2013.01)

(58) Field of Classification Search
CPC ............ G06Q 10/063112; G06Q 10/063114; G06Q 50/26; G06Q 10/06395; G06Q 10/00;
(Continued)

(56) References Cited

U.S. PATENT DOCUMENTS

| 8,314,683 | B2 | 11/2012 | Pfeffer | |
|---|---|---|---|---|
| 2004/0143811 | A1* | 7/2004 | Kaelicke | G06F 8/20 717/104 |
| 2008/0181389 | A1* | 7/2008 | Bourne | H04M 3/5175 379/265.06 |
| 2012/0072254 | A1* | 3/2012 | McLean | G06Q 10/063 705/7.14 |

(Continued)

FOREIGN PATENT DOCUMENTS

WO 2018118771 A1 6/2018

OTHER PUBLICATIONS

Park, Jihyeok & Park, Joonyoung & Lee, Yoonkyong & Kim, Chui-Joo & Kim, Byoungoh & Ryu, Sukyoung. (2018). A framework for dynamic inter-device task dispatch with eventual consistency. Programming'18 Companion 63-68. 10.1145/3191697.3191732. (Year: 2018).*
International Search Report and Written Opinion for Application No. PCT/US2020/062865 dated May 28, 2021 (14 pages).

*Primary Examiner* — Joseph M Waesco
*Assistant Examiner* — Jay-Ming Wang
(74) *Attorney, Agent, or Firm* — Michael Best & Friedrich LLP

(57) ABSTRACT

A system for on-dispatch identification and assignment of unresolved tasks. The system includes an electronic processor configured to detect that a responder unit is dispatched to respond to a first incident and, in response, correlate extracted information corresponding to the first incident with information that is stored corresponding to a plurality of unresolved tasks and identify, based on the correlation and a responder unit profile associated with the dispatched responder unit, at least one unresolved task. The electronic processor is also configured to, in response to identifying the at least one unresolved task, either cause a notification to be provided at a dispatch computer, the notification identifying (Continued)

a recommendation to assign the at least one unresolved task to the dispatched responder unit or automatically assign the at least one unresolved task to the dispatched responder unit and notify a communication device associated with the dispatched responder unit regarding the assignment.

21 Claims, 8 Drawing Sheets

(51) Int. Cl.
*G06Q 50/26* (2012.01)
*H04W 4/02* (2018.01)

(58) Field of Classification Search
CPC ........ G06Q 10/02; G06Q 10/06; G06Q 10/10; G06Q 30/02; H04W 4/023; G05B 2219/31357
See application file for complete search history.

(56) References Cited

U.S. PATENT DOCUMENTS

| | | | |
|---|---|---|---|
| 2014/0136289 A1* | 5/2014 | Settgast | G06Q 30/0206 705/7.35 |
| 2014/0279196 A1* | 9/2014 | Wilson | G06Q 30/0631 705/26.7 |
| 2015/0230072 A1* | 8/2015 | Saigh | H04W 4/90 455/404.1 |
| 2017/0124676 A1* | 5/2017 | Kreitzer | H04W 4/02 |
| 2017/0127274 A1* | 5/2017 | Lin | H04L 67/63 |
| 2017/0187878 A1* | 6/2017 | Clawson | G06Q 50/265 |
| 2017/0230799 A1* | 8/2017 | Wawrowski | H04W 4/10 |
| 2017/0238129 A1* | 8/2017 | Maier | H04W 4/029 455/404.2 |
| 2017/0278378 A1* | 9/2017 | Kaplita | G08B 25/005 |
| 2017/0301039 A1* | 10/2017 | Dyer | G06Q 10/063114 |

* cited by examiner

ON-DISPATCH IDENTIFICATION AND ASSIGNMENT OF UNRESOLVED TASKS

BACKGROUND OF THE INVENTION

A user at a public safety answering point (PSAP) may act as a call taker to handle emergency calls. The user or another user may also act as a dispatcher by entering computer aided dispatch (CAD) incident data to create new CAD incidents for emergency calls. A PSAP is often associated with one or more unresolved tasks to be dispatched.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
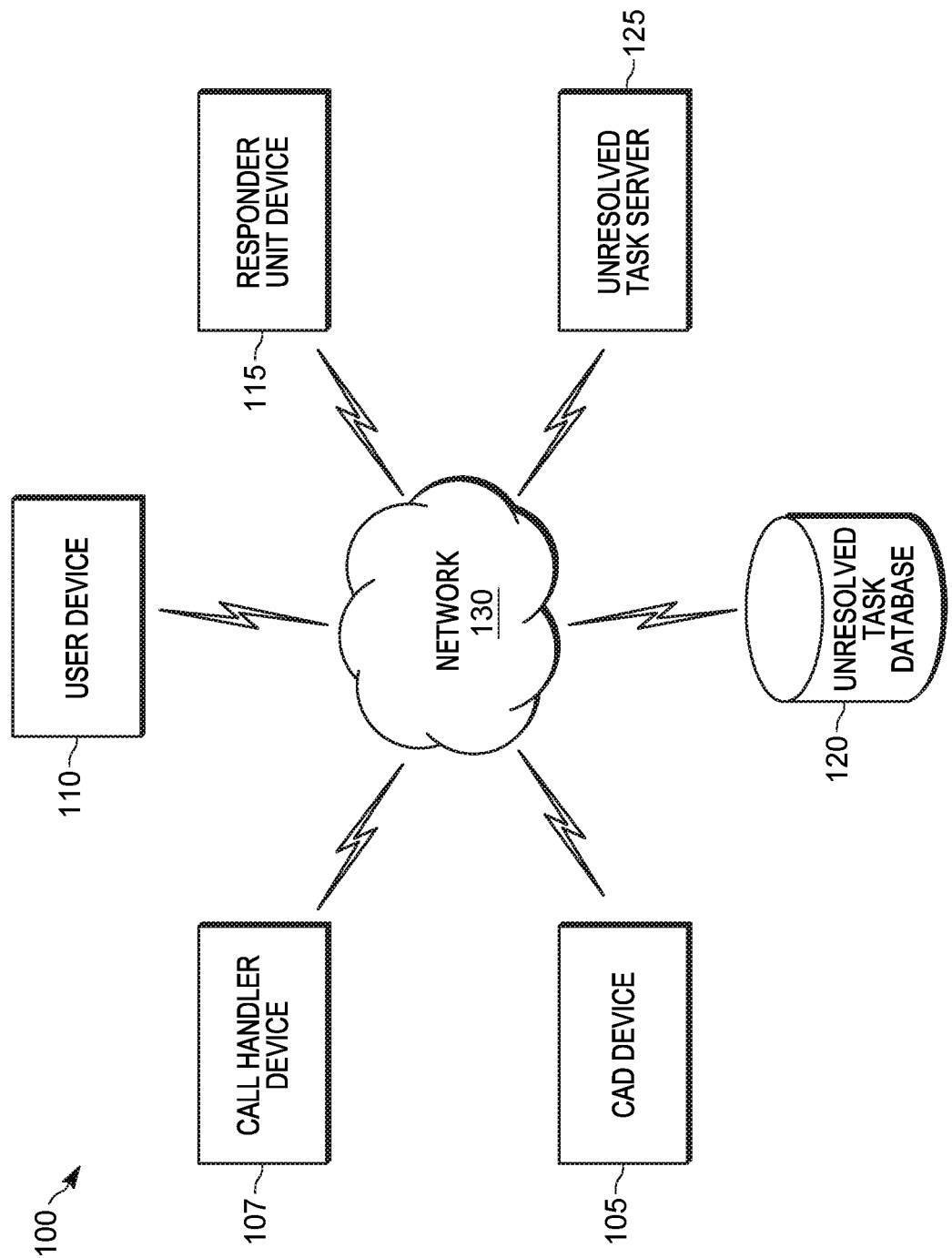
FIG. 1 is a block diagram of a system for on-dispatch identification and assignment of unresolved tasks, according to some embodiments.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Responder units in an area (for example, a city, a county, a district, or the like) may need to complete a plurality of unresolved tasks (for example, follow-up interviews, scheduled patrols, and the like) in addition to responding to incoming incidents (for example, incoming 911 emergency calls). There is a need for a system for assigning unresolved tasks to responder units that are able to resolve or complete the unresolved task. For example, a system that assigns an unresolved task to a responder unit when the responder unit is responding to an incident. The system may assign an unresolved task to a responder unit that includes equipment and responders that are able to adequately resolve the unresolved task, a responder unit that is responding to an incident that is compatible with the unresolved task (for example, does not conflict with the priority of the incident, does not conflict with the time frame for responding with the first incident, a combination of the foregoing, or the like), a responder unit that is a short travel time or distance from the incident, a combination of the foregoing, or the like. The system may automatically assign unresolved tasks to responder units or present, to dispatchers, recommendations for assigning unresolved tasks to responder units.

A system that identifies and assigns unresolved tasks to responder units that are able to resolve or complete the unresolved task allows for unresolved tasks to be completed in an efficient manner without placing an undue burden on dispatchers or responders. Therefore, described below are a system and method for on-dispatch identification and assignment of unresolved tasks.

One embodiment provides a system for on-dispatch identification and assignment of unresolved tasks. The system includes an electronic processor configured to detect that a responder unit is dispatched to respond to a first incident. In response to detecting that a responder unit is dispatched to respond to a first incident, the electronic processor is configured to correlate extracted information corresponding to the first incident with information that is stored corresponding to a plurality of unresolved tasks and identify, based on the correlation and a responder unit profile associated with the dispatched responder unit, at least one unresolved task. The electronic processor is also configured to, in response to identifying the at least one unresolved task, either cause a notification to be provided at a dispatch computer, the notification identifying a recommendation to assign the at least one unresolved task to the dispatched responder unit or automatically assign the at least one unresolved task to the dispatched responder unit and notify a communication device associated with the dispatched responder unit regarding the assignment.

Another embodiment provides a method for on-dispatch identification and assignment of unresolved tasks. The method includes detecting that a responder unit is dispatched to respond to a first incident and, in response, correlating extracted information corresponding to the first incident with information that is stored corresponding to a plurality of unresolved tasks and identifying, based on the correlation and a responder unit profile associated with the dispatched responder unit, at least one unresolved task. The method also includes, in response to identifying the at least one unresolved task, either causing a notification to be provided at a dispatch computer, the notification identifying a recommendation to assign the at least one unresolved task to the dispatched responder unit or automatically assigning the at least one unresolved task to the dispatched responder unit and notifying a communication device associated with the dispatched responder unit regarding the assignment.

FIG. 1 is a block diagram of an example of a system 100 for on-dispatch identification and assignment of unresolved tasks. In the example embodiment illustrated, the system 100 includes a computer aided dispatch (CAD) device 105, a call handler device 107, a user device 110, a responder unit device 115, an unresolved task database 120, and an unresolved task server 125. The CAD device 105, a call handler device 107, user device 110, responder unit device 115, unresolved task database 120, and unresolved task server 125 are connected via a communication network 130. The communication network 130 (which may be an example of an "intervening internet protocol (IP) network") may include wireless and wired portions. In some embodiments, all or portions of the communication network 130 operate according to an industry standard land mobile radio (LMR) or cellular protocol such as, for example, the Project 25 (P25) standard defined by the Association of Public Safety Communications Officials International (APCO), the TETRA standard defined by the European Telecommunication Standards Institute (ETSI), the Digital Private Mobile Radio (dPMR) standard also defined by the ETSI, the Digital Mobile Radio (DMR) standard also defined by the ETSI, the Long Term Evolution (LTE) (including LTE-Advanced or LTE-Advanced Pro compliant with, for example, the 3GPP TS 36 specification series), or the 5G (including a network architecture compliant with, for example, the 3GPP TS 23 specification series and a new radio (NR) air interface compliant with the 3GPP TS 38 specification series) standard, among other possibilities, and over which multimedia broadcast multicast services (MBMS), single site point-to-multipoint (SC-PTM) services, or Mission Critical Push-to-talk (MCPTT) services may be provided, or over which an open mobile alliance (OMA) push to talk (PTT) over cellular (OMA-PoC), a voice over IP (VoIP), or a PTT over IP (PoIP) application may be implemented. In some embodiments, the communication network 130 is implemented using one or more existing networks, for example, a cellular network, the Internet, a land mobile radio (LMR) network, a Bluetooth™ network, a wireless local area network (for example, Wi-Fi), a wireless accessory Personal Area Networks (PAN), a Machine-to-machine (M2M) autonomous network, and a public switched telephone network. The network 130 may also include future developed networks.

In one example, the call handler device 107 is operated by a call handler. In some embodiments, a call handler is a person who analyzes, via the call handler device 107, communications (for example, a voice call, a video call, text messages, and the like) received from a citizen (via, for example, a computer having a screen, voice, video, and text capabilities). In some embodiments, the call handler device 107 is operated by a 911 call handler that receives communications from citizens who enter 9-1-1 on a user device (for example, the user device 110). For example, a call handler device 107 may receive a call from the user device 110 of a remote caller who entered 9-1-1 on the user device 110. The user device 110 is an electronic device (for example, a smart telephone, a laptop computer, a desktop computer, a smart wearable, or other type of electronic device configured to operate as described herein). The call handler identifies an incident based on the communication, and decides how to respond to the communication to help the citizen and handle the incident. For example, the call handler may transfer the communication to a different agency (for example, animal control), take no action (for example, when the communication is a prank call or an accidental call), or transfer the communication to a dispatcher computer (for example, the CAD device 105). In some embodiments, the call handler may act as a dispatcher and the call handler device 107 may act as a dispatch computer.

In some embodiments, the incident is an event, occurrence, or situation in which officers are involved (for example, supervising, maintaining, providing assistance, and the like (for example, a concert, a sporting event, management of a theme park or other entertainment venue, and the like)). In some embodiments, the incident is a public safety incident in which public safety officers are called to a location to provide assistance in resolving or preventing a societal or environmental problem (for example, a location where a suspect is committing or has committed a crime, a fire, a vehicular accident, a traffic stop, and the like).

In some embodiments, the system 100 includes a computer aided dispatch (CAD) device 105 (for example, a dispatch computer). The CAD device 105 is operated by a dispatcher. In some situations, the CAD device 105 receives incidents, communications from citizens, or both from the call handler device 107. In some embodiments, the CAD device 105 may also receive communications from responder unit devices (for example, the responder unit device 115). The communications the CAD device 105 receives from the responder unit devices may be received through one or more intermediary devices. In some embodiments, the call handler device 107 and the CAD device 105 may be co-located, for example, in a security management office at a theme park or a public safety command center such as a police headquarters, fire station, dispatch center, public safety answering point (PSAP), operations center, command and control facility, and the like. In some situations, the dispatcher assigns an incident to a responder unit. A responder unit includes one or more responders and equipment including at least one responder unit device (for example, the responder unit device 115). A responder may be medical or police responders, supervisors, or any other individual in the field, and a responder unit device may be a computer, tablet, vehicular computing device, wearable computing device, smart phone, or the like.

It should be understood that the system 100 may include a different number of each of the components illustrated as being included in the system 100 than the number illustrated in FIG. 1. For example, the system 100 may include a different number of user devices than the single user device 110 illustrated in FIG. 1, a different number of call handler devices than the single call handler device 107 illustrated in FIG. 1, a different number of CAD devices than the single CAD device 105 illustrated in FIG. 1, a different number of responder unit devices than the single responder unit device 115 illustrated in FIG. 1, and the like. It should also be understood that the components of the system 100 may communicate with one another via one or more intermediary devices, including those not illustrated in FIG. 1. It should further be understood that the functionality described herein as being performed by one component of the system 100 of FIG. 1 may be performed by a different component of the system 100, including components that are not illustrated in FIG. 1.

Figure 2:
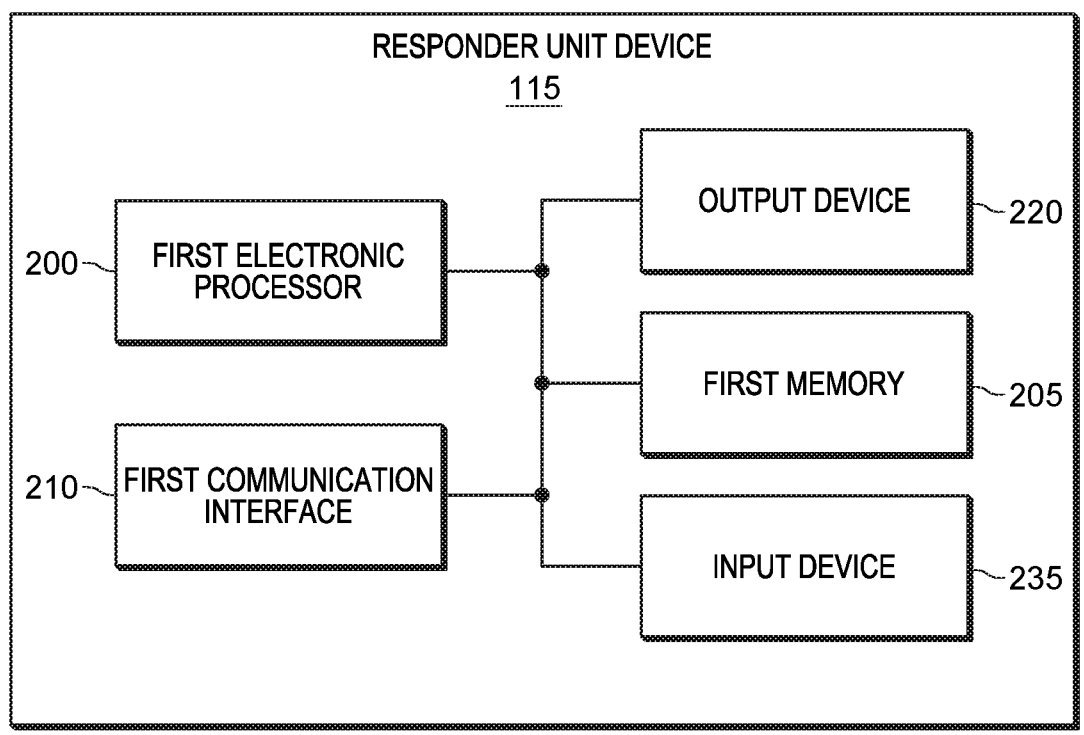
FIG. 2 is a block diagram of an example of a responder unit device included in the system of FIG. 1, according to some embodiments.

FIG. 2 is a block diagram of an example of the responder unit device 115 included in the system 100. In the example illustrated, the responder unit device 115 includes a first electronic processor 200 (for example, a microprocessor, application-specific integrated circuit (ASIC), or another suitable electronic device), a first memory 205 (a non-transitory, computer-readable storage medium), a first communication interface 210 (including, for example, a transceiver for communicating over one or more networks (for example, the network 130)), a display device 215, and an input device 220. The first memory 205 may include, for example, a hard disk, a CD-ROM, an optical storage device, a magnetic storage device, a read only memory (ROM), a programmable read only memory (PROM), an erasable programmable read only memory (EPROM), an electrically erasable programmable read only memory (EEPROM), a Flash memory, or a combination of the foregoing. The first electronic processor 200, first communication interface 210, first memory 205, display device 215, and input device 220 communicate wirelessly or over one or more communication lines or buses.

The display device 215 may be, for example, a touchscreen, a liquid crystal display ("LCD"), a light-emitting diode ("LED") display, an organic LED ("OLED") display, an electroluminescent display ("ELD"), and the like. The input device 220 may be, for example, a touchscreen (for example, as part of the display device 215), a mouse, a trackpad, a microphone, a camera, or the like. It should be understood that the responder unit device 115 may include more, fewer, or different components than those components illustrated in FIG. 2. For example, the responder unit device 115, while illustrated as having only one input device, may include multiple input devices. Also, it should be understood that, although not further described or illustrated herein, the CAD device 105 and user device 110 may include same or similar components as the responder unit device 115. Returning to FIG. 1, the unresolved task database 120 includes, in memory, a plurality of unresolved tasks to be assigned to a responder unit. In some embodiments, the memory that includes the plurality of unresolved tasks to be assigned to a responder unit is non-transitory computer readable medium. In some embodiments, the plurality of unresolved tasks to be assigned to a responder unit are stored in a single memory. In other embodiments, the plurality of unresolved tasks to be assigned to a responder unit are stored in multiple memories. The unresolved task database 120 may be included in the second memory 305 of the unresolved task server 125, in a memory of a database server separate from the unresolved task server 125, in the memory of the CAD device 105, or the like. An unresolved task may be an unresolved incident (for example, when a responder unit was unable to interview a witness to a case due to the witness being unavailable or the responder unit being assigned to a higher priority incident or a responder unit was unable to finish collecting evidence at a crime scene), a routine patrol of an area, a scheduled check-up on a vacant property, a scheduled check-up on a parolee, a follow-up with citizen who previously called in with a request to speak with a responder (for example, a police officer) in person, a patrol of a specific area at a specific time to check if a wanted suspect is present, responding to a low priority incident (for example, investigate a noise complaint about a barking dog), providing assistance for an ongoing incident, and the like. Each unresolved task is associated with information including, for example, a location of the unresolved task, a name of the unresolved task, a time frame for responding to the unresolved task and completing the unresolved task, a priority associated with the unresolved task (for example, a scale used to rank incidents from high priority to low priority), and a type associated with the unresolved task (for example, assault, drug, fire, medical, robbery, unresolved incident (for example, an unresolved incident may be created when a responder unit is unable to interview a witness to a case due to the witness being unavailable or the responder unit being assigned to a higher priority incident), routine patrol of an area, a scheduled check-up on a vacant property, scheduled check-up on a parolee, and the like), a responder associated with the unresolved task (for example, a responder who had previously been involved in the unresolved task), a combination of the foregoing, or the like. It should be noted that the priority associated with an unresolved task may change over time. For example, an unresolved task may be associated with a low priority at 6 a.m., but a time frame associated with the unresolved task may specify that the unresolved task will take up to two hours to complete and the task should be completed by 5p.m. Therefore, the priority associated with the unresolved task may be changed from low to high at 2 p.m.

In some embodiments, an unresolved task may be received by, for example, the unresolved task database 120 from a responder unit device (for example, the responder unit device 115). For example, an officer of a responder unit may create and send an unresolved task via the responder unit device 115 when a witness is unavailable for an interview. In some embodiments, an unresolved task is generated based on an incident report associated with a second incident that is different from the first incident described below in relation to FIG. 4. For example, from an incident report regarding a crime scene, an unresolved task regarding patrolling the crime scene in 24 hours or interviewing witnesses may be generated. In some embodiments, an unresolved task may be generated by reopening a resolved task (for example, associated with an incident such as the first incident described below or a different incident) based on receiving conflicting data, receiving new data, determining that an incident or task was incorrectly marked as resolved, a combination of the foregoing, or the like. For example, a resolved task regarding interviewing a witness may be reopened (marked as unresolved) when information contradicting the witness's statement is discovered. In some embodiments, the unresolved task may be generated by using natural language processing software, artificial intelligence software (for example, convolutional neural networks, Bayesian network, and the like), or both to analyze incident reports and other records (for example, call transcripts, witness statements, photographic evidence, and the like). In some embodiments, an unresolved task may be added to the unresolved task database 120 when there are no responder units (or properly equipped responder units) available to respond to an incoming incident created by the call handler device 107, as described above.

In some embodiments, the unresolved task server 125 is configured to assign an unresolved task to a responder unit or generate a recommendation for assigning a responder unit to an unresolved task to a responder unit, as described below in relation to FIG. 4.

Figure 3:
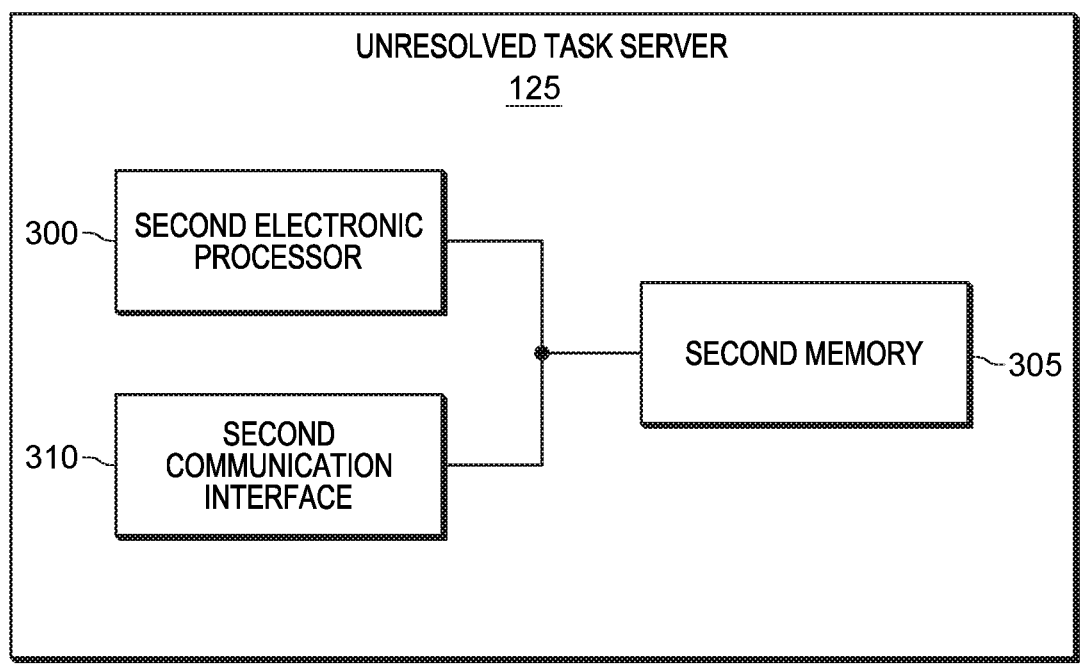
FIG. 3 is a block diagram of an example of an unresolved task server included in the system of FIG. 1, according to some embodiments.

FIG. 3 is a block diagram of an example of the unresolved task server 125 included in the system 100 of FIG. 1. In the example illustrated, the unresolved task server 125 includes a second electronic processor 300 (for example, one or more of the electronic devices mentioned previously), a second communication interface 310 (including, for example, a transceiver for communicating over one or more networks (for example, the communication network 130)), and a second memory 305 (a non-transitory, computer-readable storage medium). The second memory 305 may include, for example, the types of memory described with respect to the second memory 305. The second electronic processor 300, second communication interface 310, and second memory 305 communicate via one or more of the wired and wireless mechanisms similar to those mentioned previously with respect to FIG. 2. It should be understood that the unresolved task server 125 may include more, fewer, or different components than those components illustrated in FIG. 3.

Figure 4:
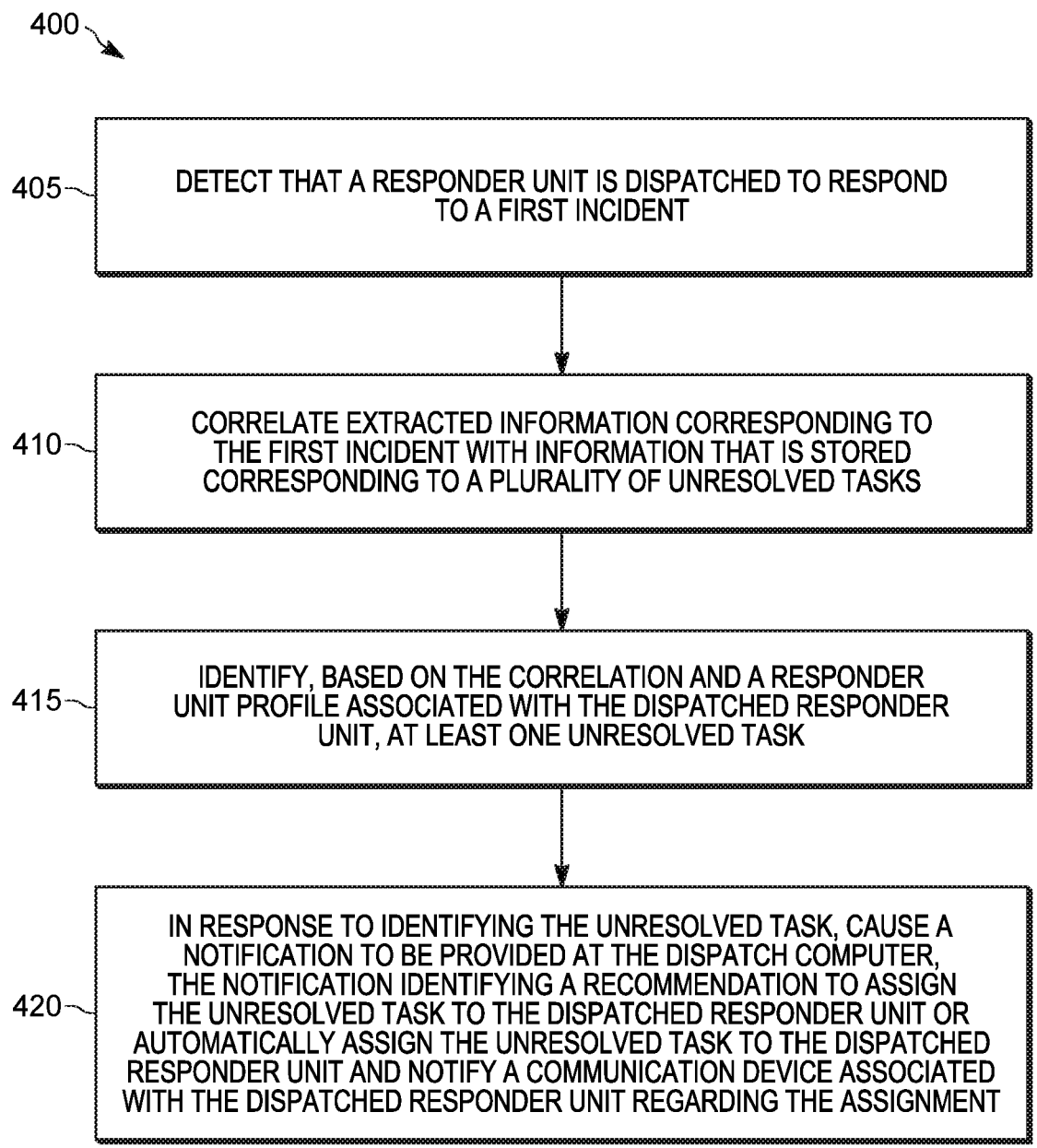
FIG. 4 is a flowchart of a method performed by the system of FIG. 1 for on-dispatch identification and assignment of unresolved tasks, according to some embodiments.
Figure 5:
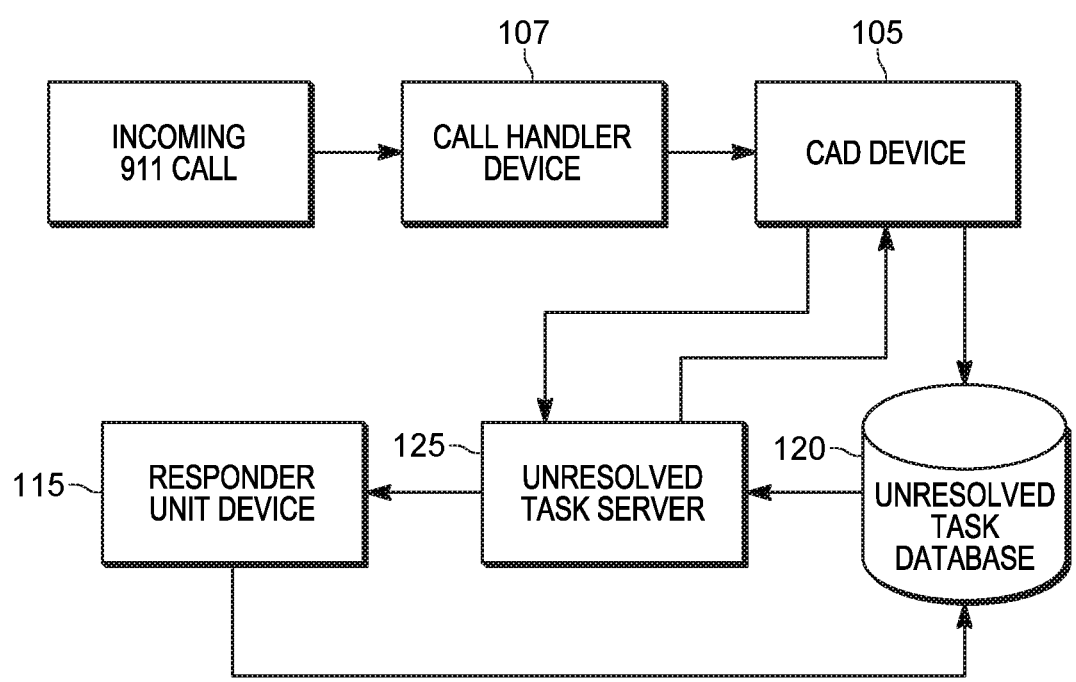
FIG. 5 is an example graphical illustration of the method of FIG. 4, according to some embodiments.

FIG. 4 is a flowchart of an example method 400 for on-dispatch identification and assignment of unresolved tasks and FIG. 5 is a diagram of an example implementation of the method 400. While the method 400 is described herein as being performed by the second electronic processor 300 included in the unresolved task server 125, in some embodiments, the method 400 is performed by the an electronic processor included in the dispatch computer (the CAD device 105), among other possibilities. In FIG. 4, at block 405, the second electronic processor 300 detects that a responder unit is dispatched to respond to a first incident. In some embodiments, the first incident may be determined by the call handler device 107 based on communication received from one or more user devices (for example, the user device 110), as described above. The first incident may be generated by the call handler device 107 using, for example, a transcription of a call from the user device 110, input from a call handler, video from the user device 110, a combination of the foregoing, and the like. In one example, the call handler device 107 may use natural language processing software to determine the first incident and information associated with the first incident from a transcription of a 911 call. In another example, the call handler device 107 may use image recognition software (for example, convolutional neural networks, Bayesian network, and the like) to determine the first incident and information associated with the first incident from video received from the user device 110. In some embodiments, the first incident may be determined by the CAD device 105 based on communication (for example, a 911 call) from a user device (for example, the user device 110) as illustrated in FIG. 5. The first incident is associated with information including, for example, a location of the first incident, a name of the first incident, a time frame for responding to the incident and completing incident response, a priority associated with the first incident (for example, a scale used to rank incidents from high priority to low priority), and a type associated with the first incident (for example, assault, drug, fire, medical, robbery, unresolved incident (for example, an unresolved incident may be created when a responder unit is unable to interview a witness to a case due to the witness being unavailable or the responder unit being assigned to a higher priority incident), routine patrol of an area, scheduled check-up on a vacant property, scheduled check-up on a parolee, and the like), one or more responders included in the responder unit dispatched to the first incident, a combination of the foregoing, or the like.

In some embodiments, a dispatcher uses the CAD device 105 to dispatch a responder unit to the first incident. In one example, the CAD device 105 may display a list of available responder units and, for each available responder unit, a responder unit profile associated with the available responder unit. Responder unit profiles may be stored in, for example, the second memory 305 of the unresolved task server 125 or a separate database. In some embodiments, the responder unit profile includes one or more responders, equipment or resources the responders are able to transport (for example, fire hose, K-9 unit, police car, ambulance, and the like), and the like. In some embodiments, the responder unit profile includes capabilities of a responder associated with the responder unit (for example, types of training the responder has received, types of experience the responder has had, types of tasks and incidents the responder is certified to handle, a combination of the foregoing, or the like), capabilities of equipment associated with the responder unit (for example, whether the equipment includes medical supplies, whether the equipment includes firefighting equipment, transportation capabilities of the equipment, a combination of the foregoing, or the like), a location of the responder unit (received from, for example, a global positioning system (GPS) included in a responder's wearable equipment, communication device, transportation means, or the like), or a combination of the foregoing. A dispatcher may decide which responder unit to assign to the first incident based on the responder unit profile associated with the responder unit. For example, when the first incident involves a drug overdose, the dispatcher may choose to assign, to the first incident, a responder unit associated with an ambulance rather than a responder unit associated with a police vehicle. In another example, when the first incident involves crowd control, a dispatcher may assign, to the first incident, a responder unit including a mounted police officer rather than a responder unit including police officers in a police car. It should be understood that, in some embodiments, the CAD device 105 may automatically assign a responder unit to the first incident based on responder unit profiles associated with available responder units. In some embodiments, the CAD device 105 may be configured to determine and display, based on responder unit profiles associated with available responder units, a list of one or more responder units recommended for responding to the first incident and the dispatcher may select a responder unit from the one or more recommended responder units. The one or more responder units may be recommended based on how well suited they are to respond to the first incident (for example, whether they include the appropriate equipment to respond to the first incident, are located near the first incident, include responder trained to respond to the first incident, a combination of the foregoing, and the like). As described above and illustrated in FIG. 5 by the arrow from the CAD device 105 to the unresolved task database 120, the first incident (an incoming incident) may be added to the unresolved task database 120 when there is no responder unit available to respond to the first incident.

At block 410, the second electronic processor 300, in response to detecting that the responder unit is dispatched to respond to the first incident, correlates extracted information corresponding to the first incident with information that is stored corresponding to a plurality of unresolved tasks. In some embodiments, one or more of the plurality of unresolved tasks may be an incident reported before the first incident or concurrently with the first incident. In some embodiments, the information corresponding to a plurality of unresolved tasks is stored in the memory of the unresolved task database 120. In some embodiments, the second electronic processor 300 periodically queries the unresolved task database 120 for updates to the plurality of unresolved tasks, queries the unresolved task database 120 for updates to the plurality of unresolved tasks when a first incident is generated, queries the unresolved task database 120 for updates to the plurality of unresolved tasks when a first incident is assigned to a responder unit, or a combination of the foregoing. In other embodiments, the unresolved task database 120 sends updates to the plurality of unresolved tasks to the second electronic processor 300 when the unresolved task database 120 receives an update to the plurality of unresolved tasks.

In some embodiments, the correlation between information associated with the first incident and information associated with an unresolved task may be represented by a correlation score where a high correlation score is representative of a high correlation between the first incident and an unresolved task, and a low correlation score is representative of a low correlation between the first incident and an unresolved task. In some examples, the correlation score may be on a binary value where the score is either "high" or "low." In some examples, the correlation score may be a numerical scale (for example, 1-10 or 1-100), where various correlations (see examples below) may add or subtract to the correlation score, and scores above a certain threshold may indicate a high correlation and scores below threshold indicate a low correlation. A high correlation between the first incident and an unresolved task is indicative of a dispatched responder unit being able to respond to the first incident and resolve the unresolved task. In some embodiments, the correlation between information associated with the first incident and information associated with an unresolved task is determined based on whether a first priority associated with the first incident does not conflict with a second priority associated with the unresolved task. For example, the correlation between the first incident may be high when the priority associated with the first incident is high and the priority associated with the unresolved task is low allowing a responder to respond to the first incident before completing the first task. In another example, the correlation between a first incident associated with high priority and an unresolved task associated with high priority is low because a dispatched responder unit cannot respond sufficiently quickly to multiple high priority tasks.

In some embodiments, the correlation between information associated with the first incident and information associated with an unresolved task is determined based on whether the unresolved task is associated with a responder associated with the first incident (included in the dispatched responder unit). In some embodiments, the correlation between information associated with the first incident and information associated with an unresolved task is determined based on whether a first time frame associated with the first incident (for example, a desired time frame in which to address the first incident) conflicts with a second time frame associated with the task (for example, a desired time frame in which to address the task). For example, when the first time frame overlaps with the second time frame such that the dispatched responder unit cannot respond to the first incident and resolve the unresolved task in the designated time frames, the correlation between the first incident and the unresolved task is low. In another example, when the first time frame and the second time frame do not overlap, and are not separated by more than an hour, the correlation between the first incident and the unresolved task is high. It should be understood that the first incident and the unresolved tasks may be associated with information other than that described herein and the correlation between the information associated with the first incident and information corresponding to a plurality of unresolved tasks may be performed based on types of information and criteria other than that described herein.

At block 415, the second electronic processor 300 identifies, based on the correlation and a responder unit profile associated with the dispatched responder unit, at least one unresolved task. In some embodiments, the second electronic processor 300 identifies the at least one unresolved task by determining that an unresolved task is associated with a type corresponding to the capabilities of the responder associated with the dispatched responder unit, capabilities of the equipment associated with the dispatched responder unit, or both. For example, when a dispatched responder unit includes a responder with training for questioning a minor, the second electronic processor 300 may assign the dispatched responder unit to an unresolved task involving interviewing a child who was witness to a crime. In some embodiments, the second electronic processor 300 is configured to identify the at least one unresolved task by determining that a current location of the responder unit is at most a predetermined travel amount from a second location associated with the unresolved task. For example, the second electronic processor 300 may identify an unresolved task to assign to a responder unit by determining that the current location of the responder unit device 115 is at most a predetermined travel amount (for example, a travel time or distance) from the location associated with the unresolved task, has a correlation score above a predetermined threshold, is capable of being performed by the responder unit, or a combination of the foregoing. In some embodiments, the predetermined travel amount may be adjusted based on the priority associated with the unresolved task. For example, the second electronic processor 300 may raise the predetermined travel amount when the unresolved task is associated with a high priority to facilitate the speedy completion of the high priority unresolved task. In some embodiments, the second electronic processor 300 may determine multiple unresolved tasks at block 415. In some embodiments, when multiple unresolved tasks are determined at block 415, the second electronic processor 300 may decrease the number of unresolved tasks determined by repeating step 415 and, for each repetition, applying progressively stricter criteria for determining one or more unresolved tasks until fewer that a predetermined number of unresolved tasks are determined.

In some embodiments, at block 420, the second electronic processor 300, in response to identifying the at least one unresolved task, executes computer executable instructions causing a notification to be provided at the dispatch computer (for example, the CAD device 105). The notification may identify a recommendation of assigning the unresolved task (or multiple unresolved tasks) to the dispatched responder unit. In some embodiments, at block 420, the second electronic processor 300 executes computer executable instructions to automatically assign the unresolved task (or multiple unresolved tasks) to the dispatched responder unit and notify a communication device (for example, the responder unit device 115) associated with the dispatched responder unit regarding the assignment. In some embodiments, the second electronic processor 300 updates an unresolved tasks list displayed by the display device of the CAD device 105 or the display device 215 of the responder unit device 115 to include the identified unresolved task (or multiple unresolved tasks) for assignment in response to identifying the unresolved task. In some embodiments, the second electronic processor 300 marks (for example, on the display device of the CAD device 105 or the display device 215 of the responder unit device 115) the unresolved task (or multiple unresolved tasks) as assigned to a responder unit after automatically assigning the unresolved task to the responder unit and notifies the responder unit device 115 regarding the assignment. An illustrative example of block 420 is provided in the description of FIGS. 6A-6C (below). In some embodiments, the second electronic processor 300 automatically assigns the unresolved task (or multiple unresolved tasks) to a responder unit when, on average, each of the call handler devices (for example, the call handler device 107) included in the system 100 is receiving communications from user devices (for example, the user device 110) at a high rate (for example, equal to or above a predetermined threshold such as one communication per five minutes), or some other loading metric, and sends notifications including recommendations of responder units to assign to an unresolved task to CAD devices included in the system 100 when, on average, each of the call handler devices included in the system 100 is receiving communications from user devices at a low rate (for example, below a predetermined threshold such as one communication every ten minutes), or some other loading metric. In some embodiments, the method 400 described in FIG. 4 is repeated each time a responder unit is dispatched to respond to an incident.

Figure 6A:
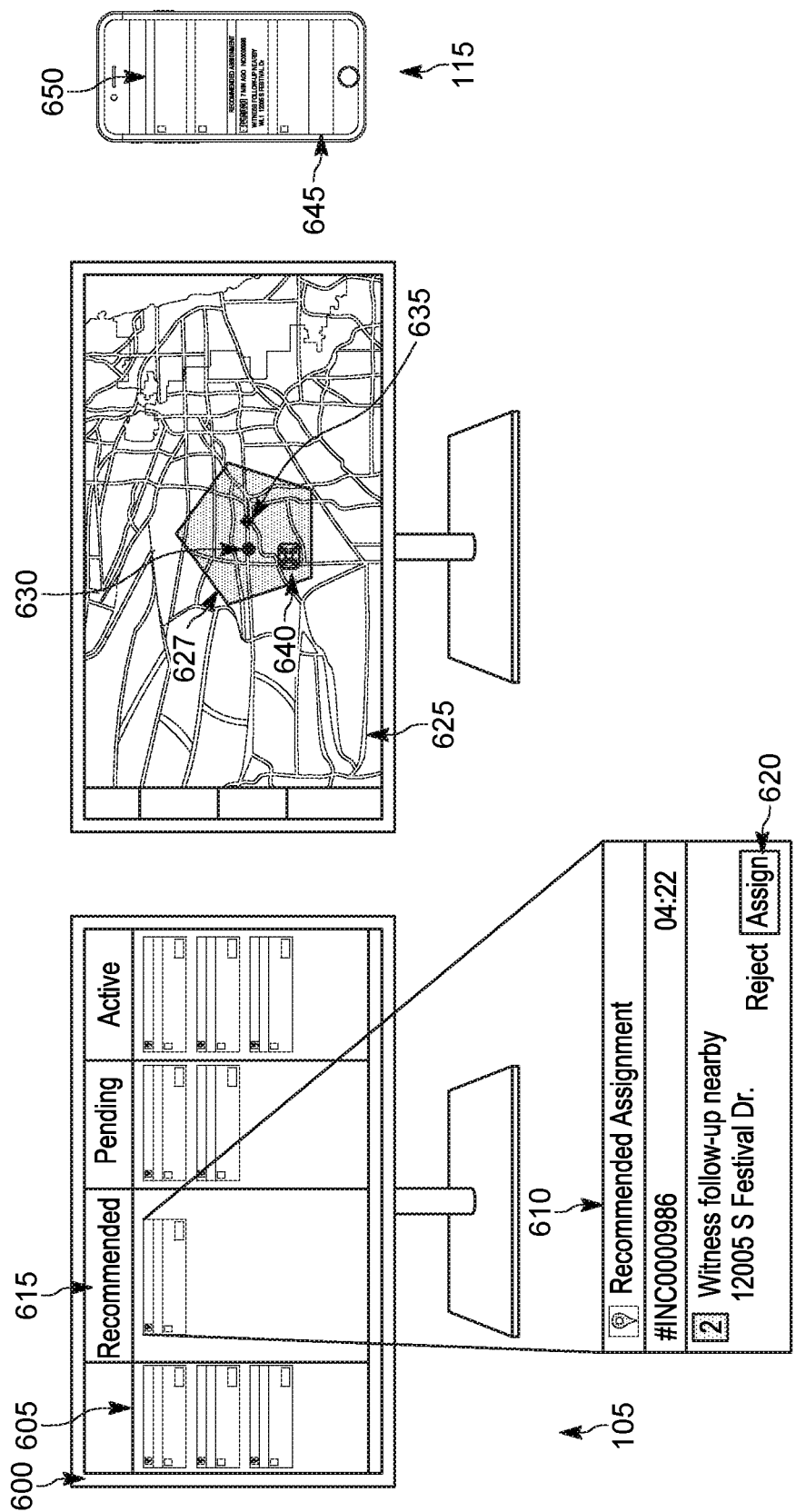
FIG. 6A-6C are example graphical user interfaces generated when the method of FIG. 4 is performed by the system of FIG. 1, according to some embodiments.
Figure 6B:
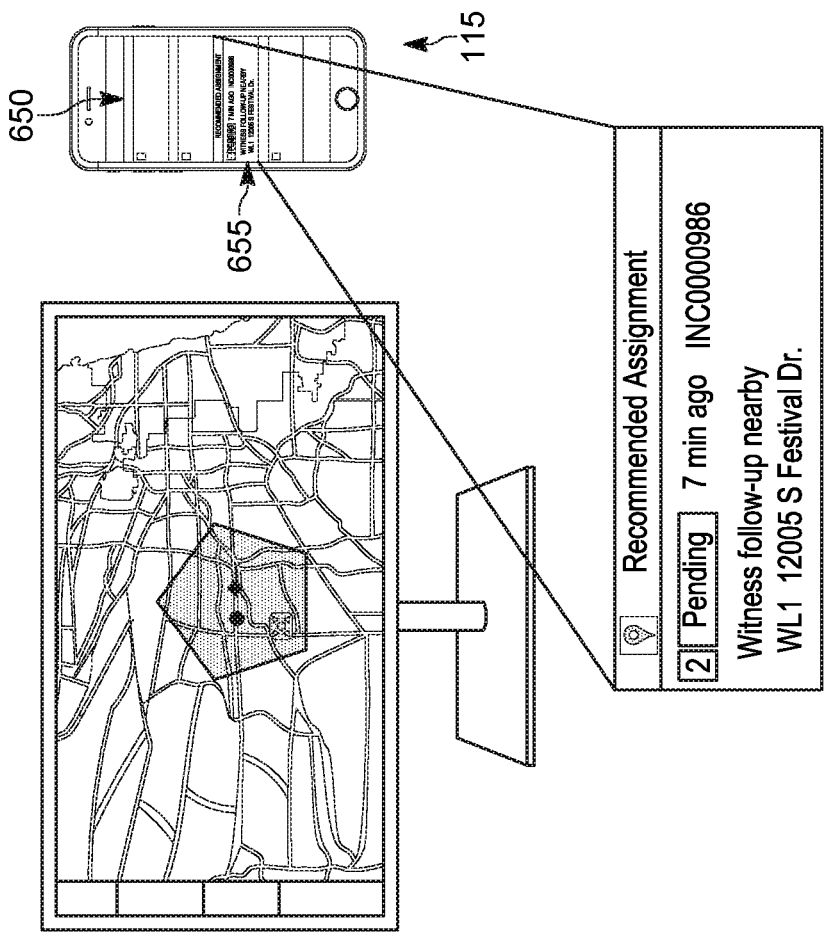
Figure 6B:
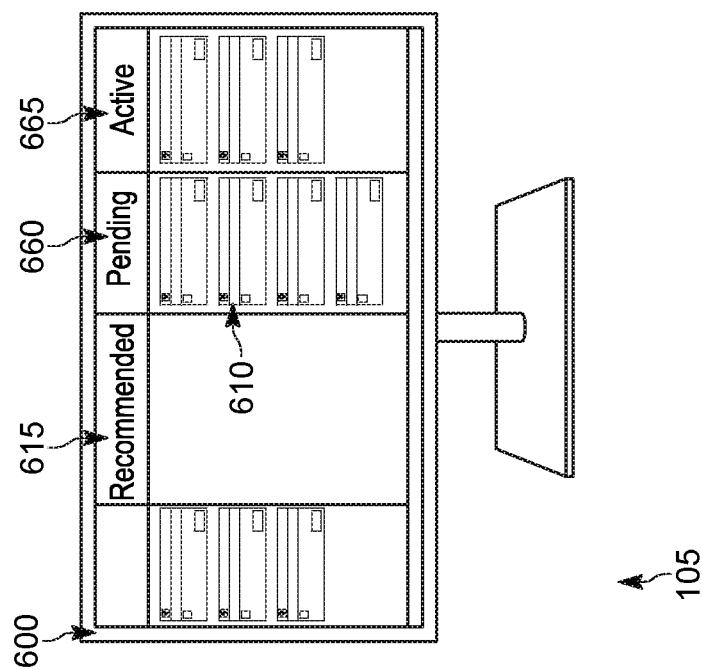
Figure 6C:
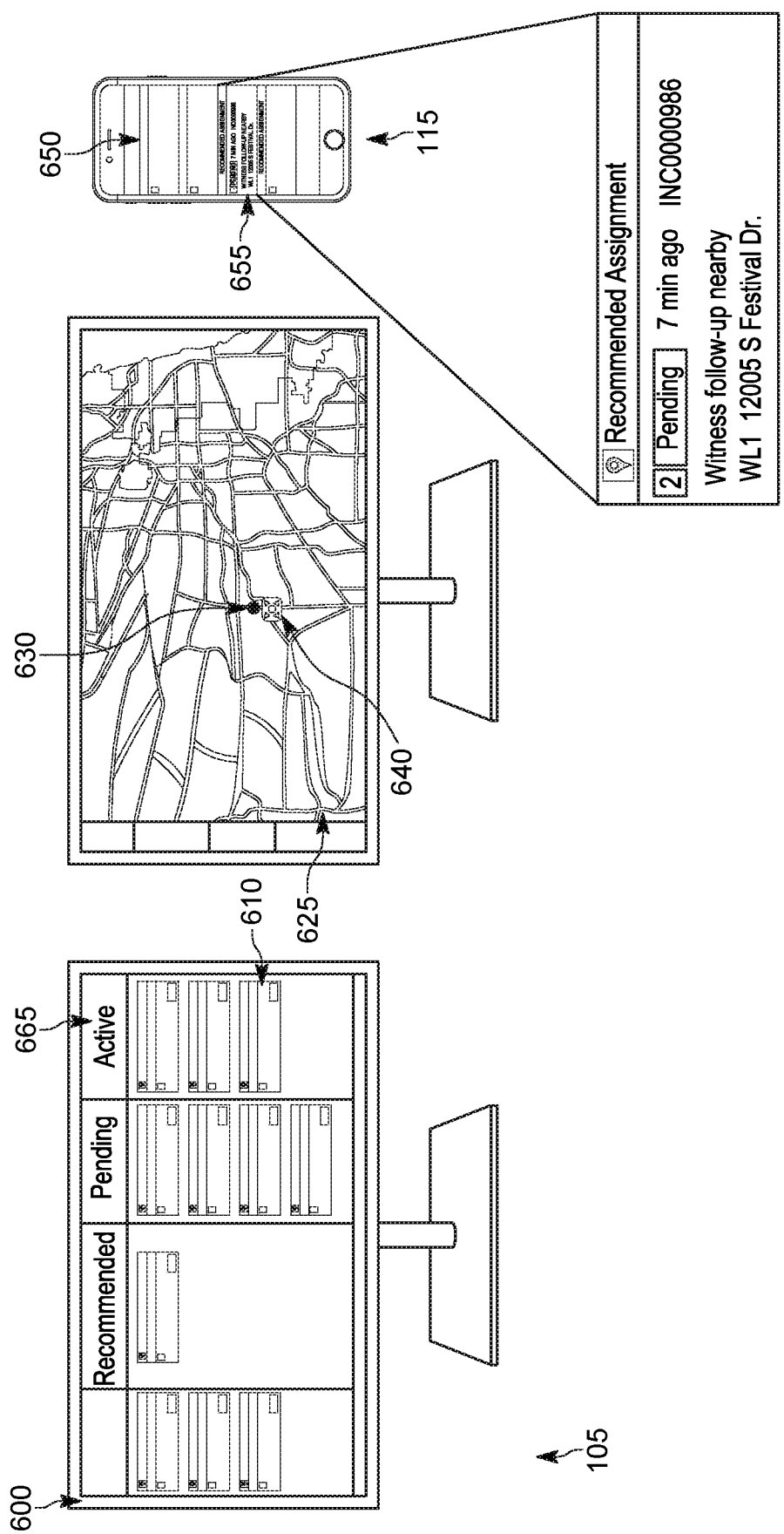

FIGS. 6A-6C illustrate examples of user interfaces displayed by a CAD device (for example, the CAD device 105) and a responder unit device (for example, the responder unit device 115) as an unresolved task is recommended for assignment to a responder unit and assigned to a responder unit. In FIG. 6A, a display device of the CAD device 105 displays a user interface 600. Using the user interface 600, a list of responder units 605 is displayed including an indication of the status of the responder unit (for example, on route to an incident, available, resolving an incident or task, and the like). In the user interface 600, the dispatcher is assigning a responder unit to an incident and a recommended assignment of a responder unit to an unresolved task is displayed as a card 610 in a "Recommended" column 615. When the dispatcher selects an "Assign" button 620 associated with the card 610, the recommended unresolved task is assigned to the responder unit. In some embodiments, the responder unit recommended to receive assignment of the unresolved task is shown on a map user interface 625 of the CAD device 105, along with the incident to which the responder unit is currently tasked with responding, a location of the recommended unresolved task, and an indication 627 of an area surrounding the responder unit (for example, the area within which locations associated with unresolved tasks must be for the unresolved task to be recommended for assignment to the responder unit). In the illustrated example, the icon 630 may represent the location of the responder unit, icon 635 may represent a location of the incident to which the responder unit is responding, and icon 640 may represent a location of a recommended unresolved task. In FIG. 6A, a user interface 645 displayed by the responder unit device 115 does not display the card 610 for the recommended unresolved task in a list of tasks 650 until the dispatcher selects the "Assign" button 620. Upon selection of the "Assign" button 620, the CAD device 105 communicates the notification (including the card 610) to the responder unit device 115, and the responder unit device 115 displays the contents of the card.

More particularly, FIG. 6B illustrates the user interface 645 of FIG. 6A, which is updated to include a card 655 for the recommended unresolved task in the list of tasks 650. The card 655 may be placed in the list of tasks based on the priority of the recommended unresolved task compared to the priority of the tasks included in the list of tasks 650. For example, when the recommended unresolved task is associated with a lower priority than the priority associated with the other tasks in the list of tasks 650, the card 655 may be positioned at the bottom-most position in the list of tasks 650. In some embodiments, once the dispatcher selects the "Assign" button, the card 610 is removed from the "Recommended" column 615 and displayed in the "Pending" column 660. In some embodiments, when the responder unit assigned to the unresolved task is not working on another, higher priority incident, the recommended unresolved task is displayed in the "Active" column 665 directly after being removed from the "Recommended" column 615.

FIG. 6C shows the card 610 displayed in the "Active" column 665 of the user interface 600. The card 610 may be displayed in the "Active" column 665 when the responder unit completes tasks in the list of tasks 650 with higher priority than the recommended unresolved task. In some embodiments, the map user interface 625 displays the icon 630 associated with the responder unit as on-route to the location associated with the recommended unresolved task. Additionally, the card 655 may be displayed in the top position in the list of tasks 650 when the responder unit completes tasks in the list of tasks 650 with higher priority than the recommended unresolved task.

It should be understood that FIGS. 6A-6C illustrate only one example embodiment of user interfaces for the CAD device 105 and responder unit device 115 of the system 100 and that variations to the user interfaces shown in FIGS. 6A-6C are possible. For example, when the second electronic processor 300 is configured to automatically assign an unresolved task to a responder unit, the user interface may not include a "Recommended" column 615.

In some embodiments, a responder unit device (for example, the responder unit device 115) sends updates to the unresolved task database 120 based on whether the responder unit completed a task assigned to it. For example, the responder unit device 115 may send a message to the unresolved task database 120 indicating that the responder unit has completed a task assigned to it and the unresolved task database 120 may delete the completed task from the unresolved tasks. In some embodiments, the unresolved task database 120 marks as complete a task that a responder unit device has indicated is complete rather than deleting the task. This communication between the unresolved task database 120 and a responder unit device is illustrated in FIG. 5 by the arrow pointing to the unresolved task database 120 from the responder unit device 115. It should be understood that, in some embodiments, the responder unit device 115 communicates with the unresolved task database 120 through one or more intermediary devices. In some embodiments, a responder unit may be assigned to an unresolved task regardless of whether the responder unit is responding to an incident. For example, the second electronic processor 300 may determine that a responder unit is near (for example, within a predetermined travel amount of) a location associated with an unresolved task and, based on the proximity of the responder unit to the location associated with the assigned task, send a notification identifying a recommendation to assign the unresolved task to the dispatched responder unit to a CAD device for display to a dispatched, the notification or automatically assign the unresolved task to the dispatched responder unit and notify a communication device associated with the dispatched responder unit regarding the assignment.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system for on-dispatch identification and assignment of unresolved tasks, the system comprising:
   an electronic processor configured to
      iteratively change a priority associated with at least one unresolved task to an increased value on a scale used to rank incidents from high priority to low priority based on at least one of a time by which the at least one unresolved task is to be completed and an estimated amount of time to complete the at least one unresolved task;
      detect that a responder unit is dispatched to respond to a first incident; and responsively:
         correlate extracted information corresponding to the first incident with information that is stored corresponding to a plurality of unresolved tasks;
         identify, based on the correlation and a responder unit profile associated with the dispatched responder unit, the at least one unresolved task by determining, through communication with a global positioning system associated with the dispatched responder unit, that a current location of the dispatched responder unit is at most a predetermined travel amount from a second location associated with the at least one unresolved task, wherein the at least one unresolved task is associated with a second incident that is different than the first incident, and wherein the electronic processor iteratively adjusts the predetermined travel amount in response to the priority associated with the at least one unresolved task changing; and
         execute, in response to identifying the at least one unresolved task, one selected from the group of:
            (i) display a first notification on a user interface of a dispatch computer, the first notification identifying a recommendation to assign the at least one unresolved task to the dispatched responder unit; and
            (ii) automatically assign the at least one unresolved task to the dispatched responder unit and causing a second notification to be displayed on a communication device associated with the dispatched responder unit regarding the assignment;
      wherein the electronic processor is further configured to display, on a map user interface of the dispatch computer, a first icon representative of the current location of the dispatched responder unit, a second icon representative of the second location associated with the at least one unresolved task, and an indication of an area established based on the predetermined travel amount from the second location associated with the at least one unresolved task.

2. The system according to claim 1, wherein the responder unit profile includes capabilities of a responder associated with the dispatched responder unit, capabilities of equipment associated with the dispatched responder unit, a location of the dispatched responder unit, or a combination of the foregoing.

3. The system according to claim 2, wherein the electronic processor is configured to identify, based on the correlation and the responder unit profile associated with the dispatched responder unit, the at least one unresolved task by determining that the at least one unresolved task is associated with a type corresponding to (i) the capabilities of the responder associated with the dispatched responder unit, (ii) the capabilities of the equipment associated with the dispatched responder unit, or (iii) both.

4. The system according to claim 1, wherein the at least one unresolved task is received from a user device, generated based on an incident report associated with the second incident, or generated by reopening a resolved task.

5. The system according to claim 1, wherein the extracted information corresponding to the first incident includes at least one selected from the group of a location, a name, a time frame, a priority associated with the first incident, an associated responder, and a type of incident.

6. The system according to claim 1, wherein the electronic processor is configured to identify, based on the correlation and the responder unit profile associated with the dispatched responder unit, the at least one unresolved task by determining that a first priority associated with the first incident does not conflict with the priority associated with the at least one unresolved task.

7. The system according to claim 1, wherein the electronic processor is configured to identify, based on the correlation and the responder unit profile associated with the dispatched responder unit, the at least one unresolved task by determining that a first time frame associated with the first incident does not conflict with a second time frame associated with the at least one unresolved task.

8. The system according to claim 1, wherein the electronic processor is configured to update an unresolved tasks list to include the at least one unresolved task for assignment at the dispatch computer in response to identifying the at least one unresolved task.

9. The system according to claim 1, the system further comprising an unresolved task server, wherein
   the electronic processor is included in the unresolved task server and is in communication with the dispatch computer, which is in communication with the dispatched responder unit, or
   the electronic processor is included in the dispatch computer and in communication with the dispatched responder unit and the unresolved task server.

10. A method for on-dispatch identification and assignment of unresolved tasks, the method comprising:
    detecting that a responder unit is dispatched to respond to a first incident; and responsively:
       correlating extracted information corresponding to the first incident with information that is stored corresponding to a plurality of unresolved tasks;
       identifying, based on the correlation and a responder unit profile associated with the dispatched responder unit, at least one unresolved task by determining, through communication with a global positioning system associated with the dispatched responder unit, that a current location of the dispatched responder unit is at most a predetermined travel amount from a second location associated with the at least one unresolved task, wherein the at least one unresolved task is associated with a second incident that is different than the first incident; and
       executing, in response to identifying the at least one unresolved task, one selected from the group of:
          (i) displaying a first notification on a user interface of a dispatch computer, the first notification identifying a recommendation to assign the at least one unresolved task to the dispatched responder unit; and
          (ii) automatically assigning the at least one unresolved task to the dispatched responder unit and causing a second notification to be displayed on a communication device associated with the dispatched responder unit regarding the assignment;
    wherein the method further includes displaying, on a map user interface of the dispatch computer, a first icon representative of the current location of the dispatched responder unit, a second icon representative of the second location associated with the at least one unresolved task, and an indication of an area established based on the predetermined travel amount from the second location associated with the at least one unresolved task.

11. The method according to claim 10, wherein the responder unit profile includes capabilities of a responder associated with the dispatched responder unit, capabilities of equipment associated with the dispatched responder unit, a location of the dispatched responder unit, or a combination of the foregoing.

12. The method according to claim 11, wherein identifying, based on the correlation and the responder unit profile associated with the dispatched responder unit, the at least one unresolved task includes determining that the at least one unresolved task is associated with a type corresponding to (i) the capabilities of the responder associated with the dispatched responder unit, (ii) the capabilities of the equipment associated with the dispatched responder unit, or (iii) both.

13. The method according to claim 10, wherein the at least one unresolved task is received from a user device, generated based on an incident report associated with the second incident, or generated by reopening a resolved task.

14. The method according to claim 10, wherein the extracted information corresponding to the first incident includes at least one selected from the group of a location, a name, a time frame, a priority, an associated responder, and a type of incident.

15. The method according to claim 10, wherein identifying, based on the correlation and the responder unit profile associated with the dispatched responder unit, the at least one unresolved task includes determining that a first priority associated with the first incident does not conflict with a second priority associated with the at least one unresolved task.

16. The method according to claim 10, wherein identifying, based on the correlation and the responder unit profile associated with the dispatched responder unit, the at least one unresolved task includes determining that a first time frame associated with the first incident does not conflict with a second time frame associated with the at least one unresolved task.

17. The method according to claim 10, the method further comprising updating an unresolved tasks list to include the at least one unresolved task for assignment at the dispatch computer in response to identifying the at least one unresolved task.

18. The method according to claim 10, the method further comprising marking the at least one unresolved task as assigned to the dispatched responder unit after the at least one unresolved task is assigned to the dispatched responder unit.

19. The method according to claim 10, further comprising:
    iteratively changing, with an electronic processor, a priority associated with the at least one unresolved task to an increased value on a scale used to rank incidents from high priority to low priority based on at least one of a time by which the at least one unresolved task is to be completed and an estimated amount of time to complete the at least one unresolved task; and
    iteratively adjusting, with the electronic processor, the predetermined travel amount in response to the priority associated with the at least one unresolved task changing.

20. The method according to claim 10, wherein the method includes displaying the first notification on the user interface of the dispatch computer, and wherein displaying the notification on the user interface of the dispatch computer includes:

displaying, on the user interface of the dispatch computer, a first column including one or more tasks that are pending to be performed by the dispatched responder unit;

displaying, on the user interface of the dispatch computer, a second column including a card that includes the notification identifying the recommendation to assign the at least one unresolved task to the dispatched responder unit;

receiving, with the dispatch computer, a user input indicating that the at least one unresolved task is to be assigned to the dispatched responder unit; and in response to receiving the user input, removing the card from the second column and displaying the card in the first column.

21. The method according to claim 10, wherein the method includes displaying the first notification on the user interface of the dispatch computer, wherein displaying the first notification on the user interface of the dispatch computer includes displaying a button configured to be selected by a dispatcher to assign the at least one unresolved task to the dispatched responder unit, and further comprising:

receiving, with the dispatch computer, a user input that selects the button; and in response to receiving the user input that selects the button, causing the second notification to be displayed on the communication device associated with the dispatched responder unit regarding the assignment.

* * * * *